United States Patent [19]

Lepere

[11] 4,063,818
[45] Dec. 20, 1977

[54] MONOCHROMATOR HAVING A TOROIDAL HOLOGRAPHIC DIFFRACTION GRATING AND UTILIZABLE IN THE ULTRAVIOLET BAND

[75] Inventor: Didier Lepere, Sevres, France

[73] Assignee: Instruments S.A., Ivry-sur-Seine, France

[21] Appl. No.: 679,870

[22] Filed: Apr. 23, 1976

[30] Foreign Application Priority Data

Apr. 28, 1975 France .................................. 75.13209

[51] Int. Cl.$^2$ ............................................... G01J 3/18
[52] U.S. Cl. .................................. 356/100; 350/162 R
[58] Field of Search ......... 350/162 R; 356/79, 99–101

[56] References Cited

FOREIGN PATENT DOCUMENTS 1,056,854   5/1959   Germany .............................. 356/100

OTHER PUBLICATIONS

Strezhnev et al., "Optics and Spectroscopy", vol. 28, No. 4, Apr. 1970, pp. 426–428.
Noda et al., "Journal of the Optical Society of America", vol. 64, No. 8, Aug. 1974, pp. 1043–1048.
Singh et al., "Optik", vol. 31, No. 3, June 1970, pp. 241–248.
Strezhnev et al., "Optics and Spectroscopy", vol. 39, No. 2, Aug. 1975, pp. 213–216.

*Primary Examiner*—F. L. Evans

[57] ABSTRACT

A monochromator having a fixed inlet slot, a holographic grating carried on a concave turnable support, and a fixed outlet slot, the support surface of the holographic grating being a concave portion of a toroidal surface, taken at the outer periphery of the toroid, and symmetrically disposed with respect to the equatorial plane of the toroid, the equatorial plane also containing the point sources for recording the holographic grating.

1 Claim, 5 Drawing Figures

MONOCHROMATOR HAVING A TOROIDAL HOLOGRAPHIC DIFFRACTION GRATING AND UTILIZABLE IN THE ULTRAVIOLET BAND

FIELD OF THE INVENTION

The invention relates to a monochromator with simple rotation of the grating, utilizable with effectivity in the region of ultraviolet light, and more particularly in the ultraviolet band for wave lengths less than 800A.

BACKGROUND OF THE INVENTION

Monochromators having concave gratings currently available on the market and operating by simple rotation of the gratings find their efficiency rapidly decreased in the ultraviolet band ($\lambda < 800A$) due to the fact that the angles of incidence at which these devices operated are relatively small, for example, less than 35°.

If a monochromator having simple rotation of the grating is used for large deviations, the losses through astigmatism become very substantial with a correspondent loss in luminosity. One can attempt to correct a part of the astigmatism by utilizing a holographic grating. However, for relatively small angles of incidence, and for short wave lengths, this astigmatism is too substantial to be able to be corrected solely by the holographic grating.

SUMMARY OF THE INVENTION

An object of the present invention is to provide a monochromator which overcomes these disadvantages and in which a monochromator with concave grating can operate at an angle of deviation exceeding 140°.

The invention is applicable to a monochromator comprising a fixed entry slot, a holographic grating carried by a turnable concave support, and a fixed output slot. According to the invention, the support surface of the holographic grating is a concave portion of a toroidal surface at the periphery of the toroid and symmetrically disposed with respect to the equitorial plane of the toroid, said equitorial plane containing the point sources for recording the holographic grating.

The invention will be better understood with reference to the description of one embodiment described hereafter by way of example and leading to the calculation of its characteristic properties. The annexed drawings also refer to this example.

DETAILED DESCRIPTION

Figure 1:
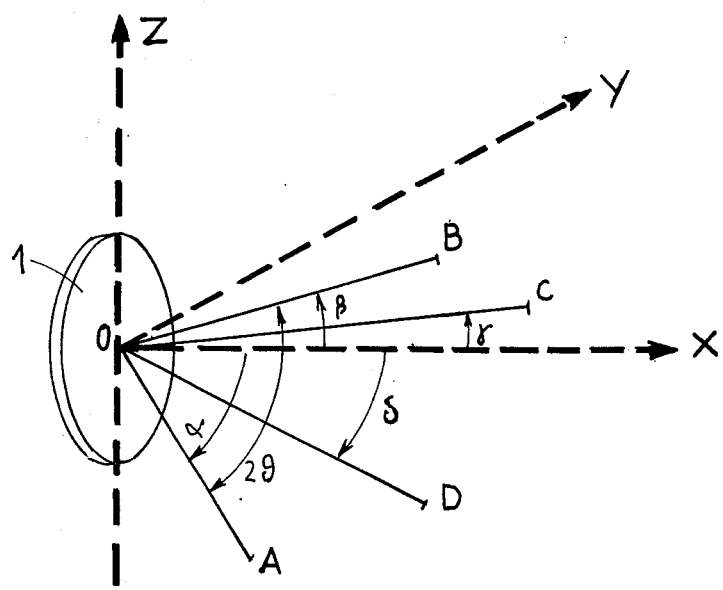
FIGS. 1 and 2 diagrammatically illustrate the coordinate reference axes and certain dimensional rotations utilized in the illustrated calculations for a support surface of a holographic grating according to the invention.
Figure 2:
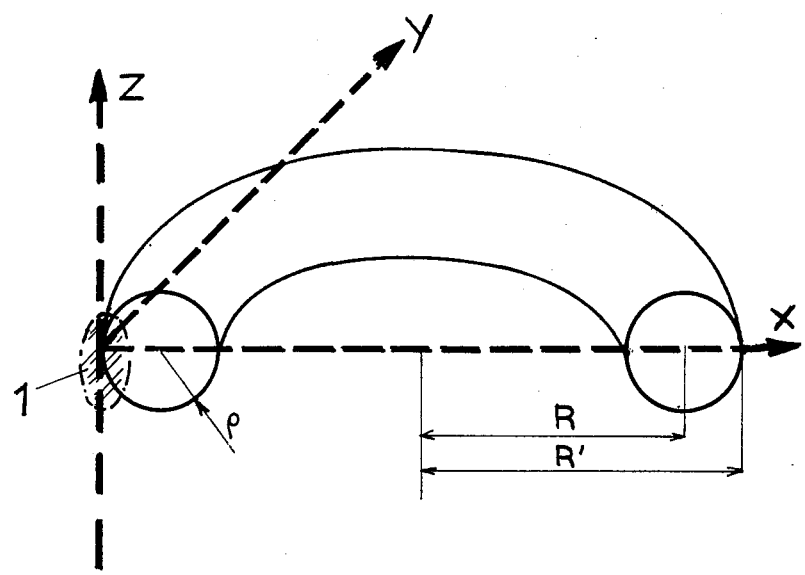

It is known to record a holographic grating on a support surface by establishing a system of interferences between two luminous beams provided by two coherent sources; the equiphase lines constituted by the intersection of the interference surfaces with the support surface determine the lines of the grating, after selective dissolution of a photopolymerizable resin previously placed on the support. With reference to FIG. 1, one such holographic grating has been recorded on the surface 1, from the source points C and D whose polar coordinates in the XOY plane are respectively $1_c, \gamma$ and $1_D, \delta$, and emitted on the wave length of recording $\lambda_o$. In the utilization of the grating in a monochromotor, one places at point A (with coordinate $1_A$, $\alpha$ a polychromatic source, and the monochromatic image of wave length $\lambda$ is formed at B ($1_B, \beta$). B is the perfect image of A if the optical path MA + MB remains constant whatever the point M in the XYZ plane of the grating, or exactly the length of a groove of the grating, this path varying from $K\lambda$ from one groove to another; K is the order of the spectrum.

In general, stigmatism is only approached and the departure from stigmatism is characterized by the aberrant optical path $\Delta$, which for holographic gratings can be placed in the known form:

$$\Delta = MA + MB - \frac{K\lambda}{\lambda_o}(MC - MD) + C$$

We have developed a series expression for a toroidal surface carrying a conventional parallel grating as well as for circular surfaces carrying a holographic grating. The transposition of these calculations, well known to those skilled in the art, permits writing the expression of $\Delta$ in the form:

$$\Delta = YR_o + \frac{Y^2}{2}T + \frac{Z^2}{2}A + \frac{Y^3}{2}C_1 + \frac{YZ^2}{2}C_2 + \frac{Y^4}{2}S_1 + \frac{Y^2Z^2}{2}S_2 + \frac{Z^4}{Z}S_3 + \ldots$$

In this expression, $R_o$ is a term which only contains the coordinates of points A B C D, independent of the dimensions of the toroidal support; this term is zero by definition when the conjugated points of source-image A and B of a holographic network are generated from point sources C and D of the hologram.

In this expression, additionally, T is a term of defocalization, A is a term of astigmatism, $C_1$ and $C_2$ are terms of coma, and $S_1$, $S_2$, and $S_3$ are terms of spherical aberrations. These terms contain, in addition to the coordinates of points A B C D, the dimensional characteristics of the toroid, i.e. the outer radius $R^1$ and the radius $p$ of the generator circle.

The geometric calculation of the monochromator consists of determining the coordinates of the points A B C D and the dimensional characteristics of the toroid which cancel or minimize the greatest possible number of those coefficients in the expression of the aberrant optical path. To cancel or minimize the term in T, we have sought its cancellation for two selected wave lengths in the region of utilization of the monochromator. As a result thereof, by fixing the number of lines N of the grating and the total angle of deviation $2\theta = \alpha - \beta$, there is attained a relation between the distances of the points A and B to the center of the grating, or at least between the relation of these distances to the radius $R^1$ of the toroid. By then varying the number of lines N of the grating and the angle of deviation $2\theta$, one is able to find the best group of values $1_A$, $1_B$, N and $\theta$ which minimize the defocalization in the contemplated spectral region; it is within the knowledge of one skilled in the art to determine a program of calculation permitting determination automatically of this best group of values.

The parameters of the points of utilization A and B being determined, as well as the number of lines per millimeter and the total deviation $2\theta$, one can determine the coordinates of the point sources C and D of the generator beams of the hologram such that one minimizes the terms of residual astigmatism and coma; this leading therefore to the solution of the following system of equations presented here in developed form:

$$\sin\gamma - \sin\delta = N\lambda_o.$$

$$T = \frac{\cos^2\alpha}{l_A} - \frac{\cos\alpha}{R^1} + \frac{\cos^2\beta}{l_B} - \frac{\cos\beta}{R^1} -$$

$$\frac{K\lambda}{\lambda_o}\left[\frac{\cos^2\gamma}{l_C} - \frac{\cos\gamma}{R^1} - \left(\frac{\cos^2\delta}{l_D} - \frac{\cos\delta}{R_1}\right)\right] = \Sigma$$

$$A = \frac{1}{l_A} - \frac{\cos\alpha}{P} + \frac{1}{l_B} - \frac{\cos\beta}{P} -$$

$$\frac{K\lambda}{\lambda_o}\left[\frac{1}{l_C} - \frac{\cos\gamma}{P} - \left(\frac{1}{l_D} - \frac{\cos\delta}{P}\right)\right] = \Sigma$$

$$C_1 = \frac{\sin\alpha}{l_A}\left(\frac{\cos^2\alpha}{l_A} - \frac{\cos\alpha}{R^1}\right) + \frac{\sin\beta}{l_B}\left(\frac{\cos^2\beta}{l_B} - \frac{\cos\beta}{R^1}\right)$$

$$- K\frac{\lambda}{\lambda_o}\left[\frac{\sin\gamma}{l_C}\left(\frac{\cos^2\gamma}{l_C} - \frac{\cos\gamma}{R^1}\right) -\right.$$

$$\left.\frac{\sin\delta}{l_D}\left(\frac{\cos^2\delta}{l_D} - \frac{\cos\delta}{R^1}\right)\right] = \Sigma$$

The correction wave length $\lambda$ being generally selected in the region of the center of the utilized spectral region, for a given radius of curvature $p$ of the toroid, it is generally possible to solve this system of four equations having four unknowns $\gamma$, $\delta$, $l_C$, $l_D$. By varying the radius of curvature $p$, one defines a family of solutions in $p$, $\gamma$, $\delta$, $l_C$, $l_D$. One thus selects a group of values which minimizes the combination of the terms of aberration over the entire range of utilization of the monochromator.

A program for calculation has been determined to establish the combination of the parameters of utilization and of construction of one such monochromator utilizing a holographic grating recorded on a toroidal support. This program permits, in addition, the determination of the value of different coefficients of the aberrant optical path for whatever value of the wave length in the considered region.

There is given hereafter by way of example the characteristics of various monochromators calculated by this method and corrected in diverse spectral regions.

Figure 3:
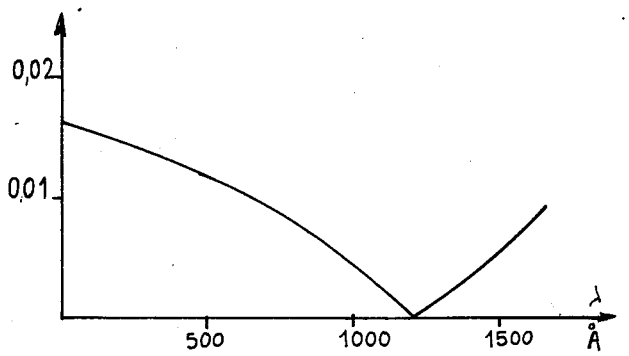
FIGS. 3, 4 and 5 are graphs characterizing the residual aberrations observed in a monochromator according to the invention. The three graphs respectively give, for a wave length region of 0 to 1600A, the relation of the height of the focal of astigmatism to the height of the grating, and the coefficients of the residual aberration of coma of first and second spaces.
Figure 4:
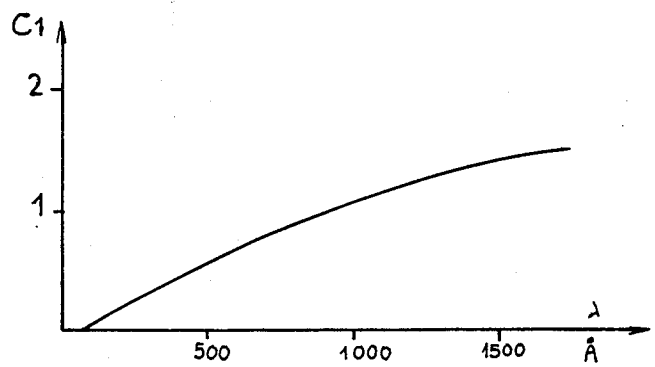
Figure 5:
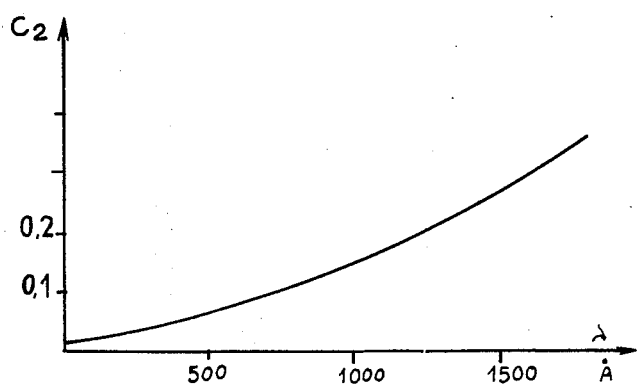

EXAMPLE 1: MONOCHROMATOR CORRECTED IN THE REGION 0-1600 A number of lines per millimeter = 550
angle of deviation : $2\theta = 142°$;
dimensions of the grating : 30 × 30 mm;
horizontal radius of the curvature : $R^1 = 1000$ mm;
vertical radius of curvature : $p = 103$ mm;
length of the arms : $l_A = l_B = 320$ mm We next refer to FIGS. 3, 4 and 5 to verify the quality of the correction of the aberrations. We see in particular in the graph in FIG. 3 that the relation of the focal magnitude of astigmatism to the total length of the grating is less than 0.02 whereas it is of the order of 2 for a conventional grating utilized for a Rowland circle. The graphs of FIGS. 4 and 5 also show the low value of the coefficients of residual aberration of coma for wave lengths corresponding to the ultraviolet band.

EXAMPLE 2: MONOCHROMATOR CORRECTED IN THE REGION 500-4000 A number of lines per millimeter : 1200
angle of deviation : $2\theta = 64°$
horizontal radius of curvature : $R^1 = 230$ mm
vertical : $p = 160$ mm
length of the object arm : $l_A = 190$ mm
length of the image arm : $l_B = 200$ mm
resolution of the order of 5 A with a height of inlet slot of 4 mm and a grating having a useful size of 40 × 45 mm

EXAMPLE 3: MONOCHROMATOR CORRECTED IN THE REGION 300-2000 A number of lines per millimeter : 1200
angle of deviation : $2\theta = 120°$
radius of horizontal curvature : $R^1 = 538$ mm
radius of vertical curvature : $p = 127.6$ mm
length of object arm : $l_A = 320$ mm
length of image arm : $l_B = 214$ mm
resolution of the order of 5 A with a height of inlet slot of 2 mm and a grating having a useful size of 30 × 30 mm. The resolution will be of the order of 2 A for a grating of 10 × 10 mm.

EXAMPLE 4: MONOCHROMATER CORRECTED IN THE REGION 100-600 A number of lines per millimeter : 600
angle of deviation : $2\theta = 160°$
radius of horizontal curvature : $R^1 = 1269$ mm
radius of vertical curvature : $\pi = 30$ mm
length of object arm : $l_A = 320$ mm
length of image arm : $l_B = 139$ mm
resolution of the order of 5 A for a height of inlet slot of 2 mm and a grating having a useful size of 10 × 10 mm.

EXAMPLE 5: MONOCHROMATER CORRECTED IN THE REGION 100-1200 A number of lines per millimeter : 300
angle of deviation : $2\theta = 160°$
radius of horizontal curvature : $R^1 = 1362$ mm
radius of vertical curvature : $\pi = 36$ mm
length of object arm : $l_A = 320$ mm
length of image arm : $l_B = 159$ mm
resolution of the order of 10 A for a height of inlet slot of 2 mm and a grating having a useful dimension of 10 × 10 mm

EXAMPLE 6: MONOCHROMATER CORRECTED IN THE REGION 50-300 A number of lines per millimeter : 200
angle of deviation : $2\theta = 170°$
radius of horizontal curvature : $R^1 = 2897$ mm
radius of vertical curvature : $\pi = 20.4$ mm
length of object arm : $l_A = 320$ mm
length of image arm : $l_B = 192.7$ mm
resolution of the order of 7 A for a height of inlet slot of 2 mm and a grating having a useful size of 10 × 10 mm Of course the invention is not strictly limited to the embodiment which has been described by way of example, but it also covers embodiments which would differ only in details, in variations of execution, or in the utilization of equivalent means. One could thus replace the toroidal surface theroretically by a surface substantially conforming with it, and for example, by a portion of an ellipsoid of revolution coincident with the toroid in this zone.

In addition, one could obtain absolutely equivalent results for monochromators homotaxic to those described hereinabove, in a relation equal to that of their radius of curvature $R^1$.

What is claimed is:

1. In a monochromator usable at a wavelength $\lambda$ in the region of ultraviolet light and having a fixed inlet slot, a holographic grating, a concave turnable support carrying said grating and a fixed outlet slot, an improvement wherein the surface of the support of the holographic grating is a concave portion of a toroidal surface, taken at the external periphery of the toroid, and disposed symmetrically with respect to the equatorial plane of the toroid, said equatorial plane containing the point sources C,D for recording the holographic grating at a wavelength of $\lambda_o$, and the conjugated source-image points A,B, the coordinates of said points A,B,C and D in polar terminology in an XYZ system in which XOY is the equitorial plane being $l_A, \alpha: l_B, B; l_C, \gamma;$ and $l_D, \delta$; said coordinates being obtained by successively minimizing the terms T,A, and $C_1$ given hereafter wherein T is a term of defocalization, A is astigmatism and $C_1$ is coma, $$\sin\gamma - \sin\delta = N\lambda_o$$

$$T = \frac{\cos^2\alpha}{l_A} - \frac{\cos\alpha}{R^1} + \frac{\cos^2\beta}{l_B} - \frac{\cos\beta}{R^1} -$$

$$\frac{K\lambda}{\lambda_o}\left[\frac{\cos^2\gamma}{l_C} - \frac{\cos\gamma}{R^1} - \left(\frac{\cos^2\delta}{l_D} - \frac{\cos\delta}{R_1}\right)\right] = \Sigma$$

$$A = \frac{1}{l_A} - \frac{\cos\alpha}{P} + \frac{1}{l_B} - \frac{\cos\beta}{P} -$$

$$\frac{K\lambda}{\lambda_o}\left[\frac{1}{l_C} - \frac{\cos\gamma}{P} - \left(\frac{1}{l_D} - \frac{\cos\delta}{P}\right)\right] = \Sigma$$

$$C_1 = \frac{\sin\alpha}{l_A}\left(\frac{\cos^2\alpha}{l_A} - \frac{\cos\alpha}{R^1}\right) + \frac{\sin\beta}{l_B}\left(\frac{\cos^2\beta}{l_B} - \frac{\cos\beta}{R^1}\right)$$

$$- K\frac{\lambda}{\lambda_o}\left[\frac{\sin\gamma}{l_C}\left(\frac{\cos^2\gamma}{l_C} - \frac{\cos\gamma}{R^1}\right) -\right.$$

$$\left.\frac{\sin\delta}{l_D}\left(\frac{\cos^2\delta}{l_D} - \frac{\cos\delta}{R^1}\right)\right] = \Sigma$$

wherein:
$R^1$ is the radius of the outer surface of the toroid at the equitorial plane, and
$p$ is the radius of curvature of the toroid.

* * * * *